United States Patent [19]

Cataldo

[11] Patent Number: 4,758,212
[45] Date of Patent: Jul. 19, 1988

[54] FAN FOLDED DRIVE BELT FOR A "V" PULLEY DRIVE

[75] Inventor: Roy S. Cataldo, Birmingham, Mich.

[73] Assignee: General Motors Corporation, Detroit, Mich.

[21] Appl. No.: 45,446

[22] Filed: May 4, 1987

[51] Int. Cl.⁴ .......................... F16G 1/26; F16G 5/00
[52] U.S. Cl. ..................................... 474/242; 474/201
[58] Field of Search .............................. 474/240–242, 474/201, 272, 265

[56] References Cited

U.S. PATENT DOCUMENTS 4,338,081  7/1982  Hattori et al. ................. 474/201 X
4,581,002  4/1986  Cataldo ............................. 474/242

*Primary Examiner*—Thuy M. Bui
*Attorney, Agent, or Firm*—Donald F. Scherer

[57] ABSTRACT

A pulley and "V" belt drive arrangement has a flexible belt disposed to transmit drive forces between two spaced "V" groove pulleys. The flexible belt is constructed from a single fan-folded metal strip which is maintained in a continuous loop by one or more continuous metal bands. The bands are disposed in a U-shaped saddle or slot area formed in the fan-folded belt. The sidewalls of the saddle prevent lateral migration of the bands. The band length is sized to provide a compression load on the fan-folded belt to prevent longitudinal separation of the ends of the belt during torque transmission between the pulleys.

1 Claim, 1 Drawing Sheet

FAN FOLDED DRIVE BELT FOR A "V" PULLEY DRIVE

BACKGROUND OF THE INVENTION

This invention relates to flexible drive belts and more particularly to metal V-belt structures having continuous band members to maintain the belt in a continuous loop.

Flexible metal V-belts are comprised of a plurality of drive blocks maintained in a continuous loop by metal bands. The bands are generally disposed in slots opening transverse to the belt. The slots are shaped to prevent band migration from the slot and also to prevent the drive blocks from moving inward relative to the bands. This structure has been used for both fan-folded type assemblies, such as that shown in U.S. Pat. No. 4,581,002 issued Apr. 8, 1986, to Cataldo, as well as a more well-known "Van Doorne" type belt.

It has been proposed in the prior art to provide a single set of centrally disposed continuous bands to maintain the belts in a continuous loop. In these arrangements, the bands are disposed in a central slot which opens outwardly. The slot is either completely closed by a pin, such as that shown in U.S. Pat. No. 4,080,841 issued Mar. 21, 1978, to Vollers, or by displacing metal fingers after assembly to capture the bands, as seen in U.S. Pat. No. 4,386,921 issued June 7, 1983, to Roberts, or by designing the slot shape to require flexing of the bands about the longitudinal axis at assembly, as seen in U.S. Pat. No. 4,465,469 issued Aug. 14, 1984, to Cataldo.

Each of these design and assembly techniques has drawbacks. Transverse slots require two sets of bands and accurate profile machining of the slot structure. The other assembly techniques require additional time and/or metal to complete the assembly.

SUMMARY OF THE INVENTION

The present invention overcomes these problems by providing a single fan-folded belt with a U-shaped centrally disposed slot or saddle. The continuous band members are shorter in length than the free loop length of the belt so that the fan-folded belt is compressed sufficiently to prevent separation of the ends of the fan-folded material while it is traveling between the pulleys. The compression also maintains the belt in a columnar structure between the pulleys thereby inhibiting separation between the fan-folded belt and the continuous band member.

It is therefore an object of this invention to provide an improved drive belt and pulley assembly wherein the drive belt has a fan-folded belt portion and a plurality of continuous bands, and further wherein the belt portion is formed in a continuous loop and has a central U-shaped saddle area in which the bands are disposed, and also wherein the bands each have a length sufficiently shorter than the free loop length of the belt to cause compression loading in the belt loop to prevent separation of the ends of the fan-folded belt.

It is another object of this invention to provide an improved fan-folded belt for a belt and pulley drive wherein the belt has a continuous loop portion formed from a strip of preformed metal with a longitudinally extending U-shaped saddle portion and a plurality of continuous metal band members disposed in the saddle portion to maintain the free ends of the loop portion in abutment, and wherein the bands each have a respective length such that at assembly, a compression force in the range of 135 to 800 pounds is imposed on the fan-folded portion to prevent separation of the free ends of the fan-folded portion during operation of the belt and pulley drive and also to ensure that a minimum compression load is maintained in the belt structure when the span in the pulley structure is traversed.

These and other objects and advantages of the present invention will be more apparent from the following specification and drawings.

DESCRIPTION OF THE PREFERRED EMBODIMENT

Figure 1:
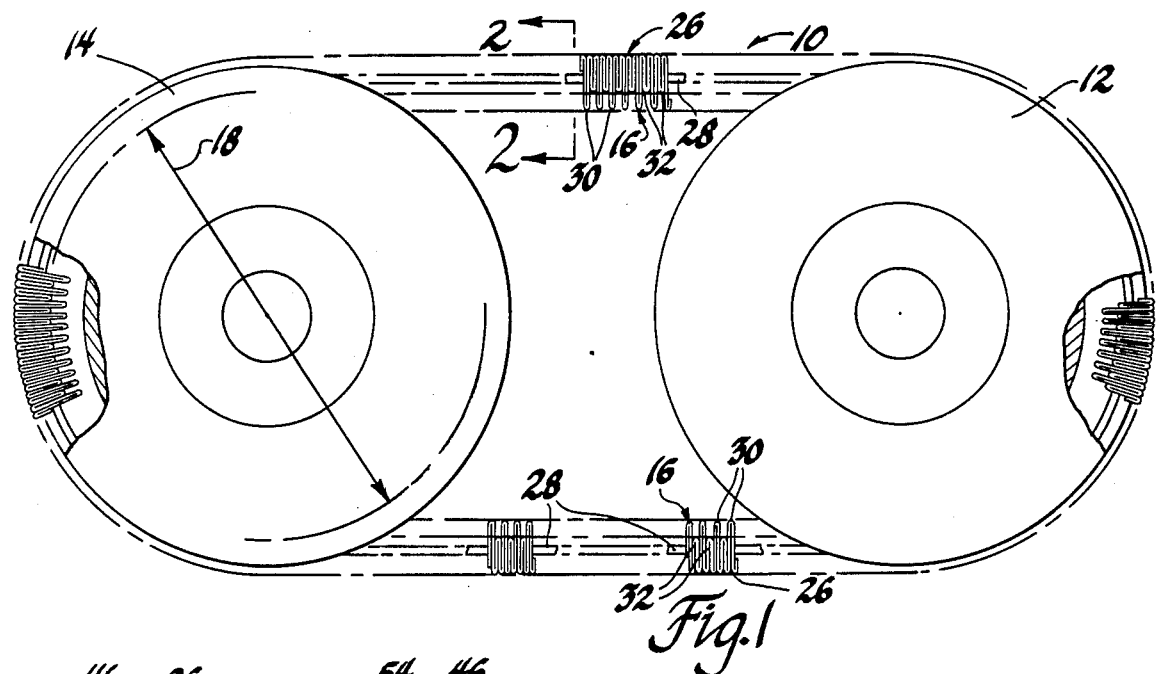
FIG. 1 is an elevational view of a belt and pulley drive system incorporating the present invention.

Referring to FIG. 1 of the drawings, there is seen a belt drive and pulley assembly, generally designated 10. This assembly 10 includes a pair of "V" groove pulleys 12 and 14 and a fan-folded metal belt assembly 16. The belt assembly 16 frictional engages "V" grooves in the pulleys 12 and 14 to provide for torque transmission between the pulleys.

The pulleys 12 and 14 are preferably of the variable "V" groove type. The structure of such pulleys is well-known. It is also known that the belt 16 engages the pulleys 12 and 14 at the pitch diameter thereof such as 18 on pulley 14. The pulleys 12 and 14 are represented in phantom in FIG. 2. Each of the pulleys has a fixed member 20 and a movable member 22. The movable member 22 is slidably disposed on a shaft portion 24 which is integral with or otherwise fastened to the fixed portion 20. As the movable portion 22 is moved toward and away from the fixed portion 20, the belt assembly 16 will move outward and inward, respectively, in the direction of Arrow A.

Figure 2:
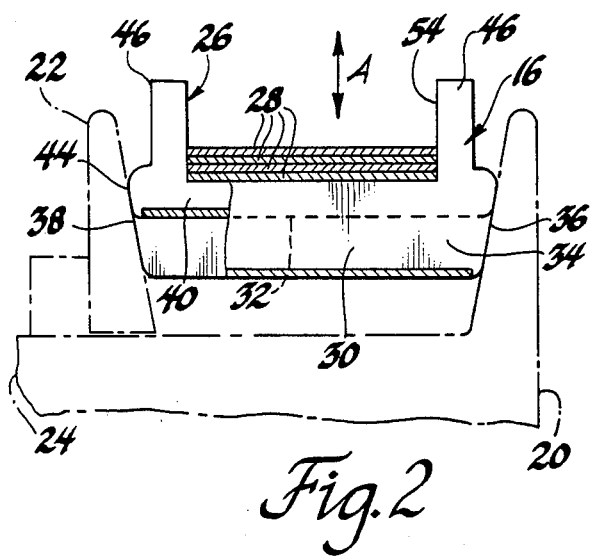
FIG. 2 is a view taken along line 2—2 of FIG. 1.

When this movement occurs, the operating pitch diameter 18 will move accordingly. If the belt assembly 16 moves upwardly, as seen in FIG. 2, the pitch diameter 18 will also move upwardly and vice versa. It should also be appreciated that the pulleys 12 and 14 operate in concert but in opposite directions. If the "V" groove pulley 12 is forcing the belt assembly 16 in the "V" groove outwardly, the pulley 14 will be adjusted to permit the belt assembly 16 to move inwardly. This permits a variable speed and torque ratio to be attained between the pulleys 12 and 14. The belt 16 is comprised of a fan-folded belt portion 26 and a plurality of continuous metal bands 28.

Figure 3:
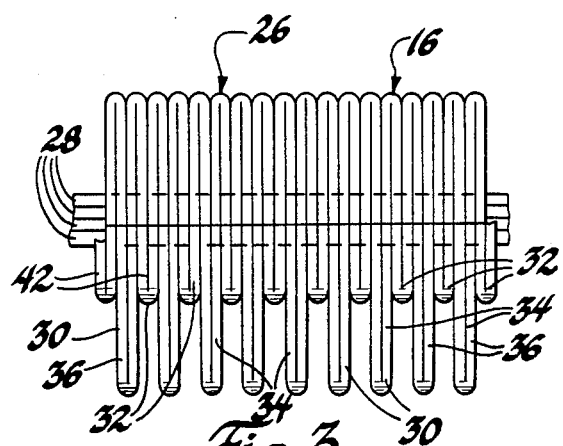
FIG. 3 is an enlarged view of the belt taken in the span between the pulleys.

As best seen in FIG. 3, the fan-folded belt portion 26 has alternating long folds 30 and short folds 32. This type of structure has been called a skip-folded belt. The long folds 30 include a drive block portion 34 which is generally trapezoidal in shape and has drive edges 36 and 38 which are operable to frictionally engage the surfaces of the fixed and movable members 20 and 22. The short folds 32 have a separator bar portion 40 which also has tapered sides 42 and 44. These tapered sides likewise frictionally engage the members 20 and 22.

Figure 4:
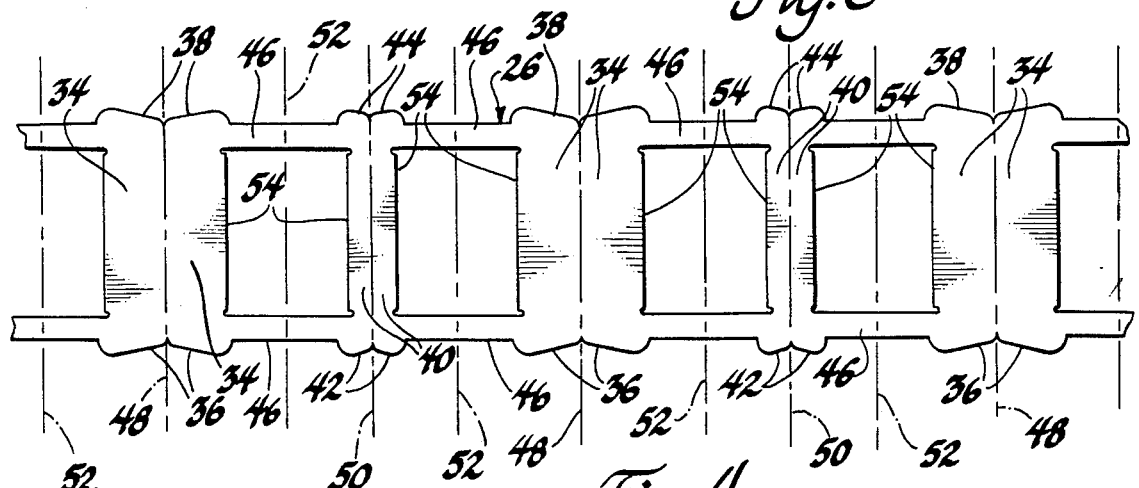
FIG. 4 is a view of the fan-folded metal portion prior to folding.

These components of the fan-folded belt 26 are seen in the unfolded state in FIG. 4. Each drive block 34 is connected to a separator bar 40 by a pair of straps 46. Likewise, each separator bar 40 is connected to the next successive drive block 34 by a pair of straps 46. Each drive block 34 is connected at a fold line 48 to the next successive drive block and each separator bar 40 is connected to the next successive separator bar 40 at a fold line 50.

Each pair of straps has a fold line 52. During the fan-folding process, the adjacent drive blocks 34 are brought into substantial abutment with each adjacent separator bar 40. The straps 46 are folded at their respective fold line 52 and cooperate with the adjoining drive block 34 and separator bar 40 to form a U-shaped slot or saddle 54 which, as seen in FIG. 2, opens outwardly relative to the belts and pulley arrangement.

As seen in FIG. 4, prior to fan folding, this U-shaped slot is a rectangular cut-away bounded by a drive block 34, a separator bar 40 and adjoining straps 46. The belt member 26 can be stamped or otherwise formed from a continuous metal strip. After folding, the fan-folded portion 26 is placed in a continuous loop. The belt assembly is then completed by compressing the continuous band members 28 in the U-shaped saddle or slot. The free ends of the fan-folded portion 26 can be separated to permit the bands 28 to be installed, then the fan-folded portion 26 is compressed to permit the free ends thereof to be placed in abutment.

The length of the bands 28 are sufficiently shorter than the free loop structure of the fan-folded belt 26 so as to impose a compressive loading in the range of 135 to 800 pounds on the belt assembly. The amount of compressive loading is determined in part by the torque loading to be imposed on the belt 16 and also by the amount of tension force the belt might incur while traversing the slack or unloaded span between the pulleys 12 and 14.

The compressive loading in the fan-folded portion 26 is also defined to be sufficient to prevent the fan-folded portion 26 from deflecting inwardly during movement between the pulleys 12 and 14. As can be seen in FIG. 2, the straps 46 extend outwardly and prevent lateral migration of the bands 28 relative to the fan-folded structure 26.

The embodiments of the invention in which an exclusive property or privilege is claimed are defined as follows:

1. A drive belt and pulley assembly comprising a pair of pulleys each having "V" groove drive surfaces and a pitch diameter on said surfaces, and a drive belt assembly drivingly connected between said pulleys and being loaded in compression between said pulleys for providing a frictional transfer of drive forces between said pulleys, said belt assembly comprising: a belt portion formed from a single strip of material in a fan-folded fashion having two free ends to provide a belt having a plurality of drive members formed during fan-folding each having a trapezoidal portion disposed for frictional engagement with said "V" groove drive surfaces at and radially inward of said pitch diameter and an upstanding "U" shaped saddle portion with a lateral support surface and sidewalls substantially perpendicular to said lateral support surface and a plurality of separator members formed between said drive members during fan-folding, each separator member having a trapezoidal section with the converging sides thereof being substantially shorter than the corresponding sides of said drive members and disposed to engage said "V" groove drive surfaces at and radially inward of said pitch diameter and an upstanding "U" shaped saddle portion having the same dimensional shape as the corresponding saddle portion of said drive member; and a plurality of continuous band means disposed in said saddle portions for maintaining said belt portion in a continuous loop by abutment of said free ends with the "U" shaped portions of the belt portion opening radially outward, said side walls preventing lateral movement of said continuous band means, and each said band means having a respective length sufficient to impose a compression force in the range of 135 to 800 pounds in said belt portion when said drive belt is disposed on said pulleys, said compression force being sufficient to prevent separation of the ends of said belt portion during compression between said pulleys and also preventing radially separation between continuous band means and said lateral surface of said "U" shaped saddle portions.

* * * * *